(12) United States Patent
Alasti et al.

(10) Patent No.: US 12,684,422 B2
(45) Date of Patent: Jul. 14, 2026

(54) NETWORK EXPOSURE FUNCTION FOR A SERVICE ORIENTED NETWORK

(71) Applicant: Boost SubscriberCo L.L.C., Englewood, CO (US)

(72) Inventors: Mehdi Alasti, Englewood, CO (US); Kazi Bashir, Englewood, CO (US); Siddhartha Chenumolu, Englewood, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 388 days.

(21) Appl. No.: 18/220,542

(22) Filed: Jul. 11, 2023

(65) Prior Publication Data

US 2025/0024331 A1 Jan. 16, 2025

(51) Int. Cl.
*H04W 28/20* (2009.01)
*H04W 28/08* (2023.01)
*H04W 12/06* (2021.01)

(52) U.S. Cl.
CPC ....... *H04W 28/20* (2013.01); *H04W 28/0867* (2020.05); *H04W 12/06* (2013.01)

(58) Field of Classification Search
CPC . H04W 28/20; H04W 28/0867; H04W 12/06; H04W 24/02; H04W 12/08; H04L 41/0894; H04L 41/0895; H04L 63/10
See application file for complete search history.

(56) References Cited

U.S. PATENT DOCUMENTS

| | | | | |
|---|---|---|---|---|
| 11,758,397 B2 * | 9/2023 | Kweon | ................... | H04L 12/14 370/329 |
| 2017/0093748 A1 * | 3/2017 | Kallin | ................... | H04L 47/765 |
| 2018/0332441 A1 | 11/2018 | Shaw et al. | | |
| 2019/0239156 A1 | 8/2019 | Wang et al. | | |
| 2022/0311744 A1 | 9/2022 | Shevade et al. | | |

FOREIGN PATENT DOCUMENTS

| | | | | | |
|---|---|---|---|---|---|
| EP | 3396997 A1 | * | 10/2018 | ............ | H04W 28/24 |
| GB | 2621184 A | * | 2/2024 | ............. | H04W 4/20 |
| WO | WO-2018196706 A1 | * | 11/2018 | ......... | H04L 41/5006 |
| WO | WO-2022194359 A1 | * | 9/2022 | ............. | G06F 8/36 |
| WO | WO-2023099011 A1 | * | 6/2023 | ............ | H04W 24/02 |

* cited by examiner

*Primary Examiner* — Cheikh T Ndiaye
(74) *Attorney, Agent, or Firm* — Seed Intellectual Property Law Group LLP

(57) ABSTRACT

A cellular network system includes a multi-core network having core slices, at least one cell site, and a network exposure layer. The cell sites are configured to receive communications from a plurality of tenants. The network exposure layer is configured to receive, through the cell site(s), a plurality of requests for bandwidth from an application programming interface (API) of the plurality of tenants. One of the requests includes a first request from a first API of a first tenant. In response to the first tenant being determined to be authenticated using information from the first request, a first core slice is determined to be associated with the first tenant. Data transfers are then provided between the first tenant and the first core slice in response to determining that the first core slice is associated with the first tenant and the first tenant being authenticated.

17 Claims, 5 Drawing Sheets

NETWORK EXPOSURE FUNCTION FOR A SERVICE ORIENTED NETWORK

BACKGROUND

Demand for mobile bandwidth continues to grow as customers access new services and applications. To remain competitive, telecommunications companies must cost-effectively expand their network while also improving user experience.

Core networks are an important element in cellular communication networks/systems. However, they often require specialized hardware and software that are expensive but sometimes such software and hardware can be underutilized since the requirements of users may be much less.

SUMMARY

Various embodiments provide solutions to provide cellular systems and methods for network exposure to users, such as tenants using application programming interfaces (APIs). In short, the tenants are assigned core slices where different core slices have different parameters. Also, the tenants may have assigned policies as well.

According to an embodiment, disclosed is a cellular network system that includes a multi-core network having core slices, at least one cell site, and a network exposure layer. The cell sites are configured to receive communications from a plurality of tenants. The network exposure layer is configured to receive, through the cell site(s), a plurality of requests for bandwidth from an application programming interface (API) of the plurality of tenants. One of the requests include a first request from a first API of a first tenant. The network exposure layer is also configured to determine whether the first tenant is authenticated using information from the first request, and in response to the first tenant being determined to be authenticated, determine a first core slice from the plurality of core slices that is associated with the first tenant. Data transfers are then provided between the first tenant and the first core slice in response to determining that the first core slice is associated with the first tenant and the first tenant being authenticated.

According to another embodiment, a system is provided for cellular communications for use with a multi-core network having a plurality of core slices. The system includes a network exposure layer, which is configured to receive a plurality of requests for access to the multi-core network through application programming interfaces (APIs) of respective plurality of tenants, the plurality of requests comprising a first request from a first API of a first tenant, and determine whether the first tenant is authenticated using information from the first request. In response to the first tenant being determined to be authenticated, a first core slice is determined from the plurality of core slices that is associated with the first tenant, and data transfers are provided between the first tenant and the first core slice in response to determining that the first core slice is associated with the first tenant and the first tenant being authenticated According to one embodiment, a method for cellular communications between tenants and a multi-core system is provided. A plurality of requests is received, at a network exposure layer, for bandwidth from an application programming interface (API) of the tenants. The plurality of requests comprising a first request from a first API of a first tenant. It is determined whether the first tenant is authenticated using information from the first request. In response to the first tenant being determined to be authenticated, a first core slice that is associated with the first tenant is determined, where the first core slice is one of a plurality of core slices in the multi-core network. Data transfers are provided between the first tenant and the first core slice in response to determining that the first core slice is associated with the first tenant and the first tenant being authenticated.

BRIEF DESCRIPTION OF THE DRAWINGS

Aspects of the present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION OF EMBODIMENTS

Figure 1:
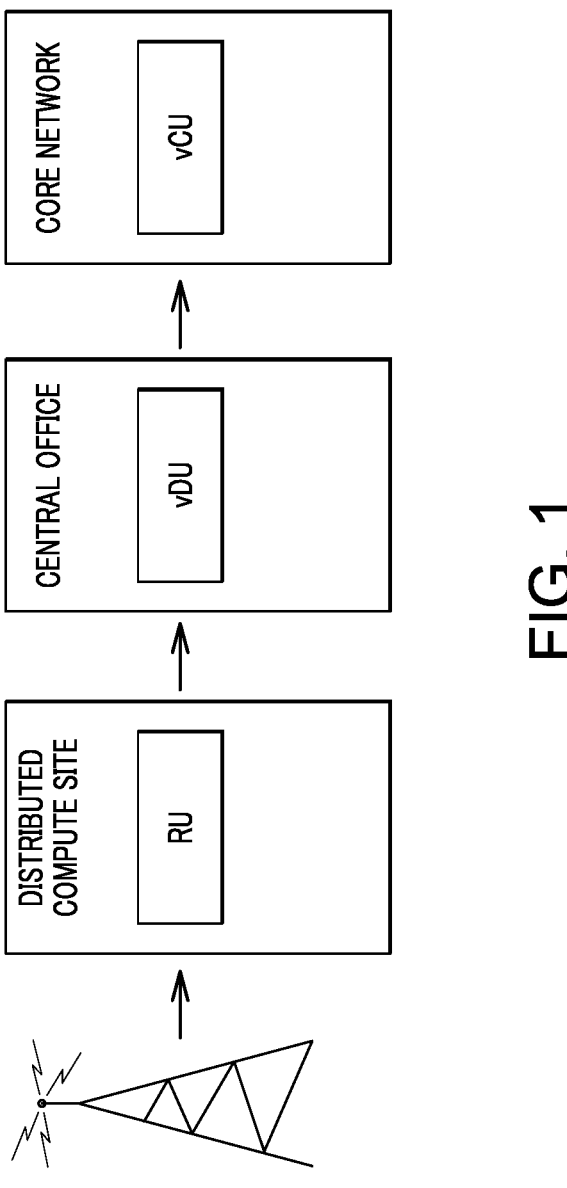
FIG. 1 illustrates a high level block diagram showing a 5G cellular network using vDUs and a vCU.

As mentioned above, various embodiments provide running containerized clusters (e.g., kubernetes clusters) along with a radio access network ("RAN") to coordinate workloads in a cellular network, such as a 5G cellular network.

Broadly speaking, embodiments of the present invention provide methods, apparatuses and computer implemented systems for configuring a 5G cellular network using servers at cell sites, cellular towers and kubernetes clusters that stretch from a public network to a private network.

Establishing a Cellular Network Using Containerized Clusters

First, the configuration using containerized application is discussed below. The containerized application can be any containerized application but is described herein as kubernetes clusters for ease of illustration, but it should be understood that the present invention should not be limited to kubernetes clusters and any containerized applications could instead be employed. In other words, the below description uses kubernetes clusters and exemplary embodiments but the present invention should not be limited to kubernetes clusters.

A kubernetes cluster may be part of a set of nodes that run containerized applications. Containerizing applications is an operating system-level virtualization method used to deploy and run distributed applications without launching an entire virtual machine (VM) for each application.

A cluster configuration software is available at a cluster configuration server. This guides a user, such as system administrator, through a series of software modules for configuring hosts of a cluster by defining features and matching hosts with requirements of features so as to enable usage of the features in the cluster. The software automatically mines available hosts, matches host with features requirements, and selects the hosts based on host-feature compatibility. The selected hosts are configured with appropriate cluster settings defined in a configuration template to be part of the cluster. The resulting cluster configuration provides an optimal cluster of hosts that are all compatible with one another and allows usage of various features. Additional benefits can be realized based on the following detailed description.

The present application uses such containerized applications (e.g., kubernetes clusters) to deploy a RAN so that the virtual distributed unit ("vDU") (also referred to herein as the "DU") of the RAN is located at one cluster and the virtual central unit ("vCU") (also referred to herein as the "CU") is located at a remote location from the vDU, according to some embodiments. This configuration allows for a more stable and flexible configuration for the RAN.

With the above overview in mind, the following description sets forth numerous exemplary details in order to provide an understanding of at least some embodiments of the present invention. It will be apparent, however, to one skilled in the art that the present invention may be practiced without some or all of these details described herein and thus, should not be limited. Operations may be done in different orders, and may or may not include some of the processes described herein. Several exemplary embodiments of the invention will now be described in detail with reference to the accompanying drawings.

FIG. 1 illustrates a system that delivers full RAN functionality using network functions virtualization (NFV) infrastructure. In the embodiment shown in FIG. 1, the RAN includes a tower, radio unit (RU), a DU, a CU, and an element management system (EMS) (not shown). This approach decouples baseband functions from the underlying hardware and creates a software fabric. Within the solution architecture, virtualized baseband units (vBBU) process and dynamically allocate resources to remote radio units (RRUs) based on the current network needs. Baseband functions are split between CU and the DUs that can be deployed in aggregation centers or in central offices (or data centers) using a distributed architecture, such as using kubernetes clusters as discussed herein.

The virtualized CUs and DUs run as virtual network functions (VNFs) within the NFV infrastructure. The entire software stack that is needed is provided for NFV, including open source software. This software stack and distributed architecture increases interoperability, reliability, performance, manageability, and security across the NFV environment.

RAN standards may have deterministic, low-latency, and low-jitter signal processing, in some embodiments. These may be achieved using containerized applications (e.g., kubernetes clusters) to control respective DUs, RUs and towers. Moreover, the RAN may support different network topologies, allowing the system to choose the location and connectivity of all network components. Thus, the system allowing various DUs on containerized applications (e.g., kubernetes clusters) allows the network to pool resources across multiple cell sites, scale capacity based on conditions, and ease support and maintenance requirements.

Figure 2:
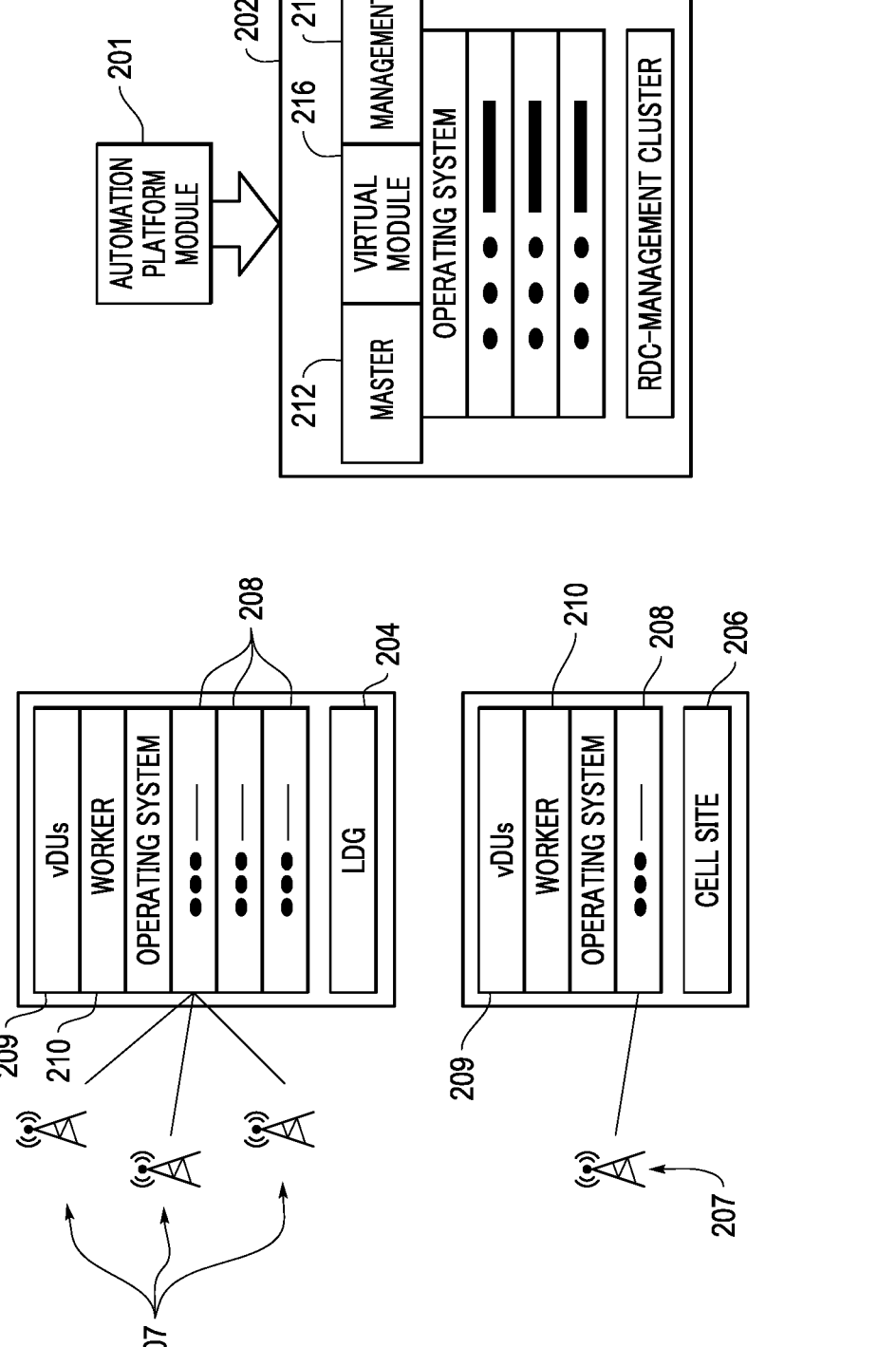
FIG. 2 illustrates a high level block diagram showing 5G cellular network with kubernetes clusters.

FIG. 2 illustrates an exemplary system used in constructing clusters that allows a network to control cell sites, in one embodiment of the invention. The system includes a cluster configuration server that can be used by a cell site to provide various containers for processing of various functions. Each of the cell sites are accessed via at least one cellular tower (and RRU) by the client devices, which may be any computing device which has cellular capabilities, such as a mobile phone, computer or other computing device.

As shown, the system includes an automation platform (AP) module 201, a remote data center (RDC) 202, one or more local data centers (LDC), and one or more cell sites 206.

The cell sites 206 provide cellular service to the client devices through the use of a vDU 209, server 208, and a tower 207. The server 208 at a cell site 206 controls the vDU 209 located at the cell site 206, which in turn controls communications from the tower 207. Each DU 209 is software to control the communications with the towers 207, RRUs, and CU so that communications from client devices (not shown) can communicate from one tower 207 through the kubernetes clusters to another cellular tower 207. In other words, the voice and data from a cellular mobile client device connects to the towers 207 and then goes through the DU 209 to transmit such voice and data to another DU 209 to output such voice and data to another tower 207 using workers 210 networked via a core network/CU.

The server(s) 208 on each individual cell site 206 or LDC 204 may not have enough computing power to run a control plane that supports the functions in the mobile telecommunications system to establish and maintain the user plane. As such, the control plane may be run in a location that is remote from the cell cites 206, such as the RDC 202.

The RDC 202 is the management cluster which manages the LDC 204 and a plurality of cell sites 206. As mentioned above, the control plane may be deployed in the RDC 202. The control plane maintains the logic and workloads in the cell sites 206 from the RDC 202 while each of the containerized applications (e.g., kubernetes containers) is deployed at the cell sites 206. The control plane also monitors the workloads that are running properly and efficiently in the cell sites 206 and fixes any workload failures. If the control plane determines that a workload fails at the cell site 206, for example, the control plane redeploys the workload on the cell site 206.

The RDC 202 may include a master 212 (e.g., kubernetes master), a management module 214 and a virtual (or virtualization) module 216. The master module 212 monitors and controls the workers 210 (also referred to herein as kubernetes workers) and the applications running thereon, such as the DUs 209. If a DU 209 fails, the master module 212 recognizes this, and will redeploy the DU 209 automatically. In this regard, the clusters system has intelligence to maintain the configuration, architecture and stability of the applications running. Accordingly, the clusters system may be considered to be "self-healing".

The management module 214 along with the Automation Platform 201 creates the clusters in the LDCs 204 and cell sites 206.

For each of the servers 209 in the LDC 204 and the cell sites 206, an operating system is loaded in order to run the workers 210. For example, such software could be ESKi and Photon OS. The DUs are also software, as mentioned above, that runs on the workers 210. In this regard, the software layers are the operating system, the workers 210, and then the DUs 209 as illustrated in FIG. 2.

The automation platform module 201 includes a GUI that allows a user to initiate clusters. The automation platform module 201 communicates with the management module 214 so that the management module 214 may create the clusters and a master module 212 for each cluster.

Prior to creating each of the clusters, the virtualization center 216 module creates a virtual machine (VM) so that the clusters can be created. VMs and containers are parts of the containerized applications (e.g., kubernetes clusters) infrastructure of data centers and cell sites. VMs are emulations of particular computer systems that operate based on the functions and computer architecture of real or hypothetical computers. A VM is equipped with a full server hardware stack that has been virtualized. Thus, a VM includes virtualized network adapters, virtualized storage, a virtualized CPU, and a virtualized BIOS. Since VMs include a full hardware stack, each VM may include a complete operating system (OS) to function, and VM instantiation thus may need booting a full OS.

In addition to VMs, which provide abstraction at the physical hardware level (e.g., by virtualizing the entire server hardware stack), containers are created on top of the VMs. Containers provide abstraction at the OS level. In most container systems, the user space is also abstracted. Application presentation systems create a segmented user space for each instance of an application. Applications may be used, for example, to deploy an office suite to dozens or thousands of remote workers. In doing so, these applications create sandboxed user spaces on a server for each connected user. While each user shares the same operating system instance including kernel, network connection, and base file system, each instance of the office suite has a separate user space.

In any event, once the VMs and containers are created, the master modules 212 then create a DU 209 for each VM, as will be described later herein.

FIG. 2 also shows an LDC 204. In some embodiments, the LDC 204 is a data center that can support multiple servers and multiple towers for cellular communications. The LDC 204 is similar to the cell sites 206 except that each LDC 204 has multiple servers 208 corresponding to multiple towers 207 whereby each cell site 206 may only have a single server. Each server in the LDC 204 (as compared with the server in each cell site 206) may support multiple towers. The server 208 in the LDC 204 may be different from the server 208 in the cell site 206 because the servers 208 in the LDC 204 are larger in memory and processing power (number of cores, etc.) relative to the servers 208 in the individual cell sites 206. In this regard, each server 208 in the LDC 204 may run multiple DUs (e.g., 2 DUs), where each of these DUs independently operates a cell tower 207. Thus, multiple towers 207 can be operated through the LDCs 204 using multiple DUs using the clusters. The LDCs 204 may be placed in bigger metropolitan areas whereas individual cell sites 206 may be placed at smaller population areas.

Figure 3:
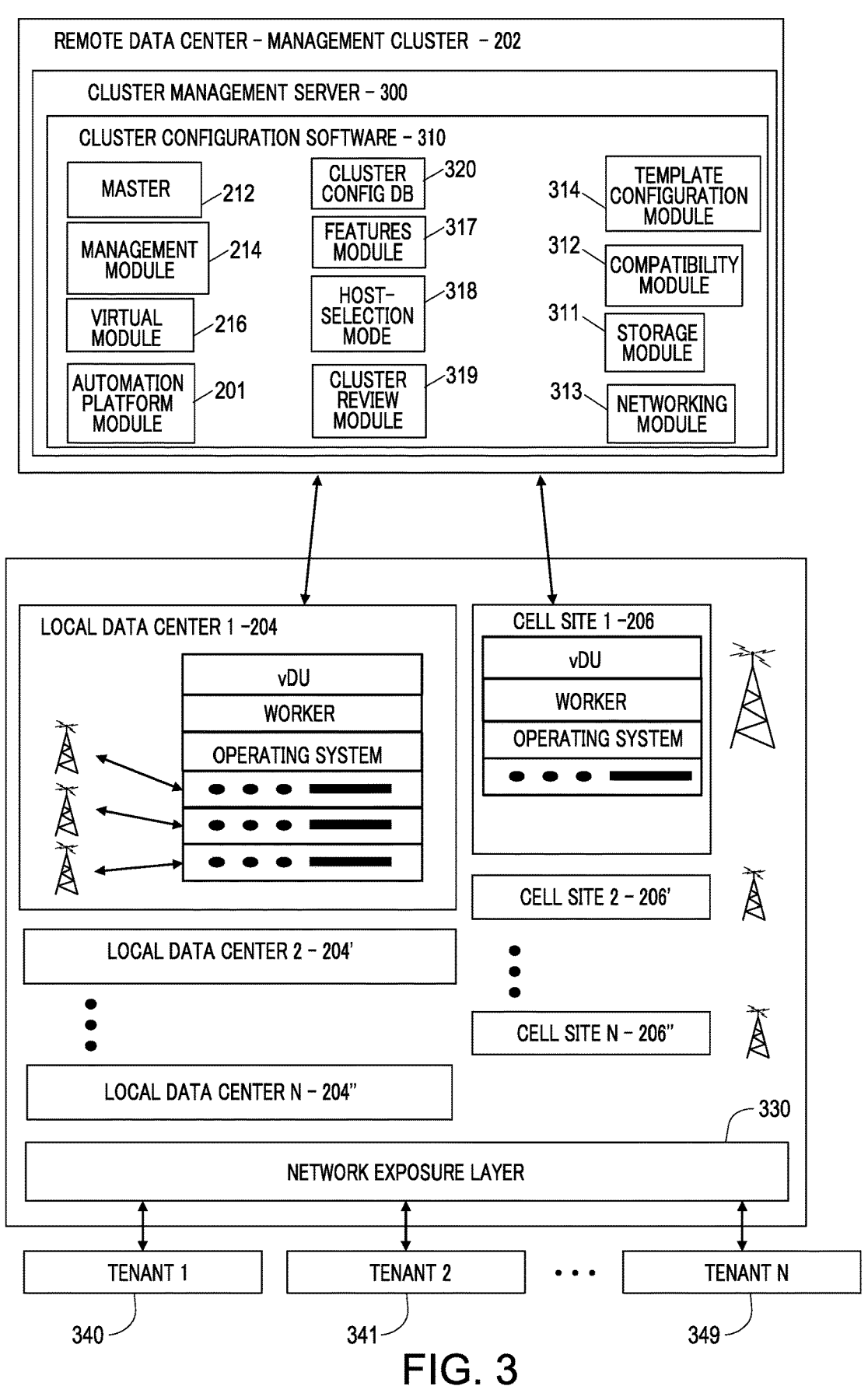
FIG. 3 illustrates a block diagram of the system of FIG. 2 but further illustrating details of cluster configuration software as well as the network exposure layer, according to various embodiments.

FIG. 3 illustrates a block diagram of the system of FIG. 2 but further illustrating details of cluster configuration software, according to various embodiments.

As illustrated, a cluster management server 300 is configured to run the cluster configuration software 310. The cluster configuration software 310 runs using computing resources of the cluster management server 300. The cluster management server 300 is configured to access a cluster configuration database 320. In one embodiment, the cluster configuration database 320 includes a host list with data related to a plurality of hosts 330 including information associated with hosts, such as host capabilities. For instance, the host data may include list of hosts 330 accessed and managed by the cluster management server 300, and for each host 330, a list of resources defining the respective host's capabilities. Alternately, the host data may include a list of every host in the entire virtual environment and the corresponding resources or may include only the hosts that are currently part of an existing cluster and the corresponding resources. In an alternate embodiment, the host list is maintained on a server that manages the entire virtual environment and is made available to the cluster management server 300.

In addition to the data related to hosts 330, the cluster configuration database 320 includes features list with data related to one or more features including a list of features and information associated with each of the features. The information related to the features include license information corresponding to each feature for which rights have been obtained for the hosts, and a list of requirements associated with each feature. The list of features may include, for example and without limitations, live migration, high availability, fault tolerance, distributed resource scheduling, etc. The list of requirements associated with each feature may include, for example, host name, networking and storage requirements. Information associated with features and hosts are obtained during installation procedure of respective components prior to receiving a request for forming a cluster.

Each host is associated with a local storage and is configured to support the corresponding containers running on the host. Thus, the host data may also include details of containers that are configured to be accessed and managed by each of the hosts 330. The cluster management server 300 is also configured to access one or more shared storage and one or more shared network.

The cluster configuration software 310 includes one or more modules to identify hosts and features and manage host-feature compatibility during cluster configuration. The configuration software 310 includes a compatibility module 312 that retrieves a host list and a features list from the configuration database 320 when a request for cluster construction is received from the client. The compatibility module 312 checks for host-feature compatibility by executing a compatibility analysis which matches the feature requirements in the features list with the hosts capabilities from the host list and determines if sufficient compatibility exists for the hosts in the host list with the advanced features in the features list to enable a cluster to be configured that can utilize the advanced features. Some of the compatibilities that may be matched include hardware, software and licenses.

It should be noted that the aforementioned list of compatibilities are exemplary and should not be construed to be limiting. For instance, for a particular advanced feature, such as fault tolerance, the compatibility module checks whether the hosts provide a compatible processor family, host operating system, hardware virtualization enabled in the BIOS, and so forth, and whether appropriate licenses have been obtained for operation of the same. Additionally, the compatibility module 312 checks to determine if networking and storage requirements for each host in the cluster configuration database 320 are compatible for the selected features or whether the networking and storage requirements may be configured to make them compatible for the selected features. In one embodiment, the compatibility module checks for basic network requirements. This might entail verifying each host's connection speed and the subnet to determine if each of the hosts has the desired speed connection and access to the right subnet to take advantage of the selected features. The networking and storage requirements are captured in the configuration database 320 during installation of networking and storage devices and are used for checking compatibility.

The compatibility module 312 identifies a set of hosts accessible to the management server 300 that either matches the requirements of the features or provides the best match and constructs a configuration template that defines the cluster configuration settings or profile that each host needs to conform in the configuration database 320. The configuration analysis provides a ranking for each of the identified hosts for the cluster. The analysis also presents a plurality of suggested adjustments to particular hosts so as to make the particular hosts more compatible with the requirements. The compatibility module 312 selects hosts that best match the features for the cluster. The cluster management server 300 uses the configuration settings in the configuration template to configure each of the hosts for the cluster. The configured cluster allows usage of the advanced features during operation and includes hosts that are most compatible with each other and with the selected advanced features.

In addition to the compatibility module 312, the configuration software 310 may include additional modules to aid in the management of the cluster including managing configuration settings within the configuration template, addition/deletion/customization of hosts and to fine-tune an already configured host so as to allow additional advanced features to be used in the cluster. Each of the modules is configured to interact with each other to exchange information during cluster construction. For instance, a template configuration module 314 may be used to construct a configuration template to which each host in a cluster may conform based on specific feature requirements for forming the cluster. The configuration template is forwarded to the compatibility module which uses the template during configuration of the hosts for the cluster. The host configuration template defines cluster settings and includes information related to network settings, storage settings and hardware configuration profile, such as processor type, number of network interface cards (NICs), etc. The cluster settings are determined by the feature requirements and are obtained from the Features list within the configuration database 320.

A configuration display module may be used to return information associated with the cluster configuration to the client for rendering and to provide options for a user to confirm, change or customize any of the presented cluster configuration information. In one embodiment, the cluster configuration information within the configuration template may be grouped in sections. Each section can be accessed to obtain further information regarding cluster configuration contained therein.

A features module 317 may be used for mining features for cluster construction. The features module 317 is configured to provide an interface to enable addition, deletion, and/or customization of one or more features for the cluster. The changes to the features are updated to the features list in the configuration database 320. A host-selection module 318 may be used for mining hosts for cluster configuration. The host-selection module 318 is configured to provide an interface to enable addition, deletion, and/or customization of one or more hosts. The host-selection module 318 is further configured to compare all the available hosts against the feature requirements, rank the hosts based on the level of matching and return the ranked list along with suggested adjustments to a cluster review module 319 for onward transmission to the client for rendering.

The cluster review module 319 may be used to present the user with a proposed configuration returned by the host-selection module 318 for approval or modification. The configuration can be fine-tuned through modifications in appropriate modules during guided configuration set-up which are captured and updated to the host list in either the configuration database 320 or the server. The suggested adjustments may include guided tutorial for particular hosts or particular features. In one embodiment, the ranked list is used in the selection of the most suitable hosts for cluster configuration. For instance, highly ranked hosts or hosts with specific features or hosts that can support specific applications may be selected for cluster configuration. In other embodiments, the hosts are chosen without any consideration for their respective ranks. Hosts can be added or deleted from the current cluster. In one embodiment, after addition or deletion, the hosts are dynamically re-ranked to obtain a new ranked list. The cluster review module 312 provides a tool to analyze various combinations of hosts before selecting the best hosts for the cluster.

A storage module 311 enables selection of storage requirements for the cluster based on the host connectivity and provides an interface for setting up the storage requirements. Shared storage may be needed in order to take advantage of the advanced features. As a result, one should determine what storage is shared by all hosts in the cluster and use only those storages in the cluster in order to take advantage of the advanced features. The selection options for storage include all the shared storage available to every host in the cluster. The storage interface provides default storage settings based on the host configuration template stored in the configuration database 320 which is, in turn, based on compatibility with prior settings of hosts, networks and advanced features and enables editing of a portion of the default storage settings to take advantage of the advanced features. In one embodiment, if a certain storage is available to only a selected number of hosts in the cluster, the storage module 311 will provide necessary user alerts in a user interface with tutorials on how to go about fixing the storage requirement for the configuration in order to take advantage of the advanced features. The storage module performs edits to the default storage settings based on suggested adjustments. Any updates to the storage settings including a list of selected storage devices available to all hosts of the cluster are stored in the configuration database 320 as primary storage for the cluster during cluster configuration.

A networking module 313 enables selection of network settings that is best suited for the features and provides an interface for setting up the network settings for the cluster. The networking module provides default network settings, including preconfigured virtual switches encompassing several networks, based on the host configuration template stored in the cluster configuration database, enables selecting/editing the default network settings to enter specific network settings that can be applied/transmitted to all hosts, and provides suggested adjustments with guided tutorials for each network options so a user can make informed decisions on the optimal network settings for the cluster to enable usage of the advanced features. The various features and options matching the cluster configuration requirements or selected during network setting configuration are stored in the configuration database and applied to the hosts so that the respective advanced features can be used in the cluster.

FIG. 3 also illustrates cell sites 206, 206', 206" that are configured to be clients of each cluster. Each cell site 206, 206', 206" is shown as includes a cellular tower 207 and a connection to each distributed unit (DU), similar to FIG. 2. Each DU is labeled as a virtualized distributed unit (vDU) 209, similar to FIG. 2, and each DU runs as virtual network functions (VNFs) within the an open source network functions virtualization (NFV) infrastructure.

Network Exposure Function

Also shown in FIG. 3, is a network exposure layer 330 which is configured to expose core network capabilities to users, such as any number of tenants 340/341/349. The core network exposure layer consists of a 5G network exposure function (NEF) 408 (shown in FIG. 4), which offers network capabilities exposure of the 5G core toward external applications integrated with the network.

Figure 4:
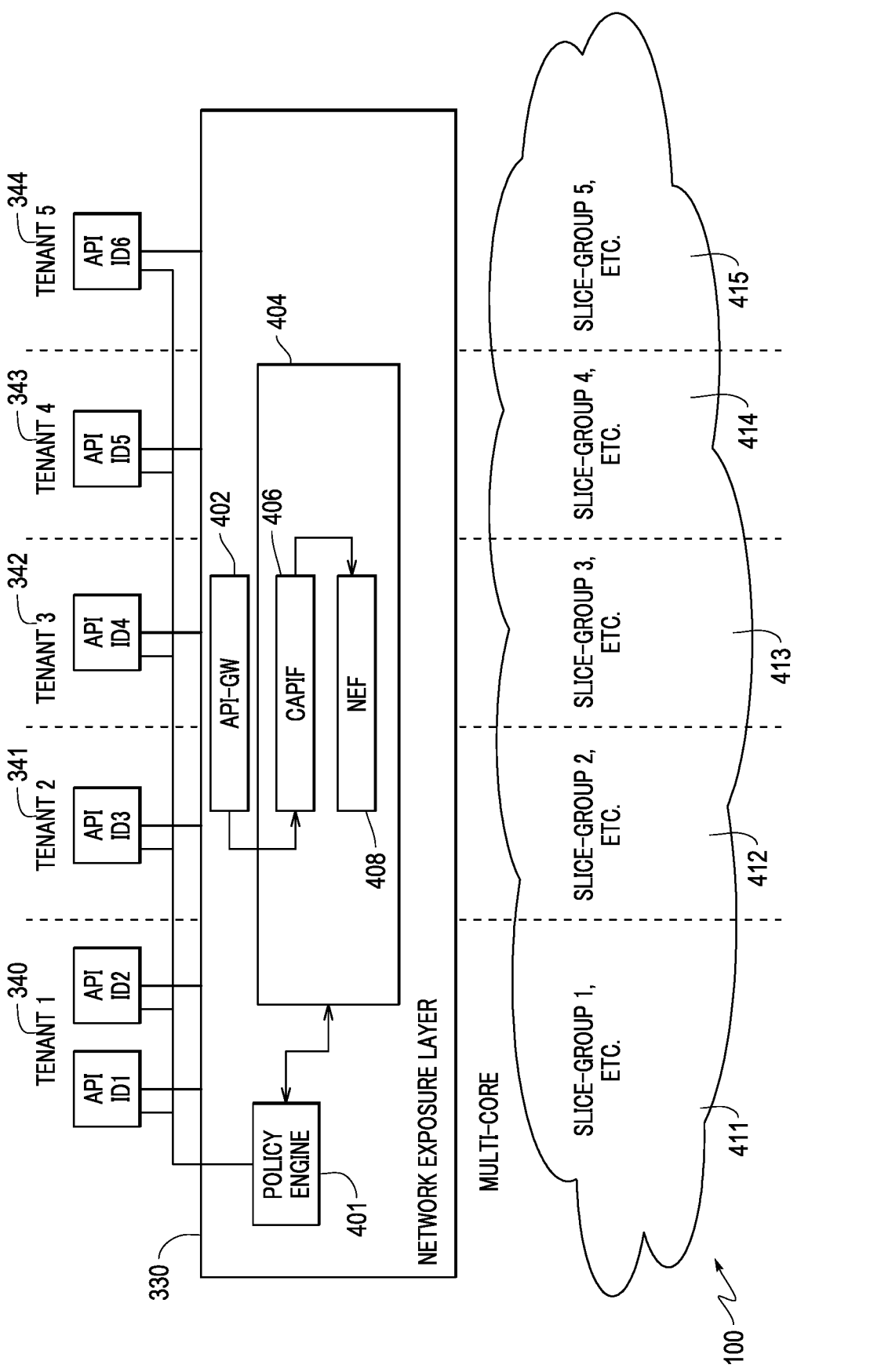
FIG. 4 illustrates an overall architecture of a network exposure layer with respect to tenants and the multi-core network, according to various embodiments.
Figure 5:
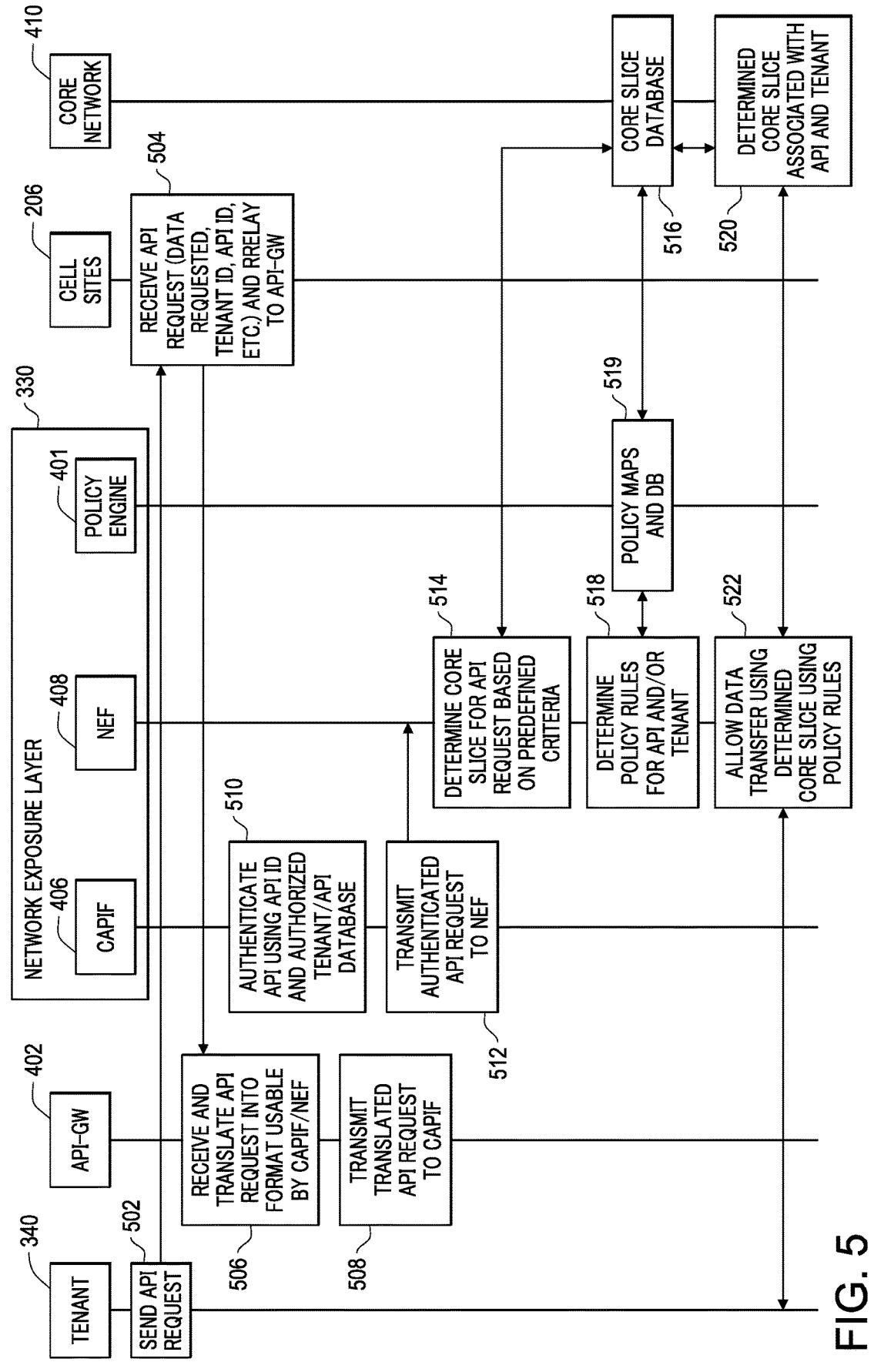
FIG. 5 illustrates a method of network exposure function in a service oriented network, in according with some embodiments.

With the above overview of the various components of a system used in the network exposure, specific details are shown in FIGS. 4 and 5.

FIG. 4 illustrates an overall architecture of a network exposure layer with respect to tenants and the multi-core network, according to various embodiments. FIG. 4 illustrates a series of tenants 340-344 that each have one or more APIs. Each of the APIs have a unique API ID that identifies the API and the tenant.

As mentioned above, the network exposure layer 330 includes the NEF 408. The network exposure layer 330 also includes an API gateway (API-GW) 402 a common API framework (CAPIF) 406. Communication to the tenant's applications are facilitated using the northbound APIs, which will request data transfer from the core network 410 via the network exposure layer 330.

The API-GW 402 interfaces directly with the APIs of the tenants 340-344. The API-GW 402 is software that receives an application request, routes it to one or more backend services 404 (e.g., CAPIF, NEF, etc.), gathers the appropriate data from the core network 401 and if authorized, delivers such data to the requesting API in a single, combined package. In this regard, the API-GW 402 acts as a router between the tenant APIs and the core network 410 via the backend services 404.

For example, a first tenant 340 may send a request data from the core network 410 using a first API (API ID1) associated with or assigned to the first tenant 340 and such request is received first by API-GW 402. API-GW 402 translates the request into a format usable by the CAPIF 406 and NEF 408.

The CAPIF 406 includes common aspects applicable to any northbound service APIs. As such, the CAPIF 406 is a complete 3GPP API framework that covers functionality related to on-board and off-board API invokers, register and release APIs that need to be exposed, discovering APIs by third entities, as well as authorization and authentication. In the examples shown in FIG. 4, the CAPIF 406 provides authorization of APIs to onboard and offboard the APIs. CAPIF functionality is considered as a part of the realization of 5G openness, since it allows secure exposure of 5G core APIs to third party domains, and also, enables third parties to define and expose their own APIs.

The NEF 408 is configured to communicate between the API and the multi-core network in response to the API being authenticated by the CAPIF. If the API is not authenticated the CAPIF 406 will not pass the API request to the NEF, in one embodiment, or the NEF 408 will not transmit the API request to the core network.

The network exposure layer 330 may also include a policy engine 401. The policy engine 401 may integrate policies into service applications. The policy engine 401 may configure policies for tenants based on API IDs. Accordingly, each tenant may have certain policies assigned to them by the core network manager. The policies may include: the rules by which the data would be transferred to the API, the data rates the data would be transferred to the API, how much data could be transferred to the API, when the data could be transferred to the API, the type of data that could be transferred, and the like.

The policy engine 401 is connected directly to the APIs, as shown in FIG. 4 so that data can be directly received from the APIs from the policy engine 401. Moreover, the policy engine 401 then communicates directly with the network exposure backend functions 404 (e.g., NEF 408) to enable the policy rules. The CAPIF 406 and/or the NEF 408 access the policy engine 401 when a request from an API is sent so that policies are determined for the API requesting access to the core network 410. In this regard, policies as assigned to each respective API by the core network operator based on various factors, such as the subscription the tenant has, etc.

For example, when a first API of a first tenant 340 (tenant 1) sends a request for access to the core network 410, the API request is transmitted to the API-W 402. Then the CAPIF/NEF 404 accesses the policy engine to determine the policies stored in a database that is assigned to the first tenant 340. Accordingly, when the NEF 408 exposes the core network 410 to the first tenant 340, the data transfer between the NEF 408 and the first tenant 340 only occurs using the predetermined policy associated with the first tenant 340.

Also, the core network 410 can include core slices. For purposes of understanding certain embodiments of systems and architectures disclosed herein, it is important to appreciate the technologies and data that may be associated with network communications for 3rd Generation Partnership Project (3GPP) mobile system architectures. The following information may be viewed as a basis from which determining the core slices to be used with the tenants may be properly explained.

Network slicing overlays multiple virtual networks on top of a shared network domain, that is, a set of shared network and computing resources. Network slicing is used for 5G networks, in part because the 5G specification calls for network slicing as a capability, whereas 4G and earlier generations of cellular data services did not and could not support network slicing.

Each slice of the core network can have its own logical topology, security rules and performance characteristics within the limits imposed by the underlying physical networks. Different core slices can be dedicated to different purposes, such as ensuring a specific application or service gets priority access to capacity and delivery or isolating traffic for specific users or device classes. Slicing the core network enables the network operator to maximize the use of network resources and service flexibility.

Core slicing technologies are more fully realized with the rise of software-defined networking and, more recently, software-defined wide area networks (SD-WANs), which apply SDN concepts to wide area networking. SDN separates the network's control plane from the packet-handling data plane. The control plane can define virtual networks by defining packet-handling rules and pushing those rules out to the data plane devices for execution. This control of the data plane applies to both physical and virtual network devices managed under the SDN controller, which is a physical switch in a rack or a virtual switch running in a cloud environment or on a hypervisor in the data center.

For some use cases, the network operator will want or need to dedicate network infrastructure to a specific slice of the network, like assigning a virtual firewall to a specific virtual network instead of using a shared firewall. In some cases, this step is done to meet specific customer compliance or network security requirements. In other cases, network managers will look to improve network performance or minimize the overhead of providing services. For example, the network operator could deploy an instance of a low-cost or free firewall instead of paying for a more expensive one.

One downside to core network slicing is aggregation. An SDN approach enables aggregation of physical connectivity—the melding of multiple physical connections into a switch, for example—with the resulting pooled capacity then made available for slicing.

The core network slicing is a feature of 5G according to some embodiments. Core slice implementation applies the same principles of virtualization across the entire provider network architecture. These principles include radio access networks and the supporting backhaul and carrier core networks that underlie 5G, including associated data center resources. Core slicing enables service providers to create a variety of network slice architectures that deliver meaningful guarantees to the tenants regarding, say, a minimum amount of throughput for their connections or priority delivery of packets from specific types of devices or applications.

The network operator can physically segregate traffic on different radio networks, slice a single network, or combine the capacity of multiple networks and slice the pooled resources. This enables the network operator to choose the characteristics needed to support their target levels of spectrum efficiency, traffic capacity and connection density, which is how many devices can connect from a given space.

In FIG. 5, the core network 410 includes five slices, including slice-group 1, slice-group 2, slice-group 3, slice-group 4, and slice-group 5, but it should be understood that there can be any number of core slices and thus, the present invention should not be so limited.

Each respective tenant 340-344 is associated with a specific core slice. For example, tenant 1 340 may be assigned core slice 1 411, tenant 2 341 may be assigned core slice 2 412, tenant 3 342 may be assigned core slice 3 413, tenant 4 343 may also be assigned core slice 1 411, tenant 5 343 may be assigned core slice 5 415, etc. In this regard, each tenant 340-344 has only one core slice 411-415 it is assigned to and thus, only accesses the core network 410 it is assigned to.

Each core slice 411-415 may have different parameters, different hardware, etc. For example, core slice 411 may be a premium core slice which has a high capacity, high speeds, etc. which typically is more expensive because the hardware components required for such parameters cost more. Core slice 412 may be a lower cost core slice having a low capacity, lower speeds, etc. which is less expensive than the core slice 411.

Each API is associated with a core slice, according to some embodiments. In this regard, a single tenant could have APIs that are directed to different core slices. For example, API 1 of Tenant 1 340 in FIG. 5 could be assigned to core slice 1 411 while API 2 of Tenant 1 340 in FIG. 4 could be assigned to core slice 2 412.

In another embodiment, each tenamt is associated with a core slice.

Referring back to FIG. 4, when the NEF 408 receives a request for core access from the first tenant 340 (for example), the NEF 408 determines which core slice 411-415 the first API of the first tenant 340 is associated with and thus, which core slice 411-415 the first tenant 340 is authorized to be exposed to.

In this regard, the network exposure function allows specific APIs of specific tenants to only access specific predetermined core slices and under predetermined policies.

It should be understand that the present application is described with respect to tenants but tenants may be users or any other entity and need not be limited to a tenant.

Also, each tenant may have any number of APIs.

FIG. 5 illustrates a method of network exposure function in a service oriented network, in according with some embodiments. FIG. 5 shows actions by various entities including the tenant (in this case, tenant 340 was used for ease of illustration), API-GW 402, CAPIF 406, NEF 408, policy engine 401, cell sites 206, and core network 410. However, it should be understood that these entities should not limited and any number can be employed.

In 502, the tenant using an API sends an API request, which can include data requested, tenant ID, API ID, etc. The API request may be sent directly using a tower of a cell site using standard protocols or non-standard protocols. In 503, the API request is received by the cell site 206 which then is configured to route the request to the API-GW 402. For example, the cellular tower receives the request via an over the air transmission from a cellular device that transmits the API request. The cellular tower then will route the API request to the API-GW 402, which may be another cellular over-the-air transmission to the API-GW 408 remotely located or may be routed via wired connection locally to the API-GW 408.

In any event, the API-GW 402 receives and, if needed, translates the API request into a format usable by the CAPIF/NEF in the network exposure layer 330, as provided in block 506. In some embodiments, the API request may be in a format that is not compatible with CAPIF/NEF and thus, needs to be formatted so that CAPIF/NEF can process the API request. In this regard, the API-GW 402 will determine the format of the API request, unpack the API request, and then pack the API request back into a new API request with a format that is compatible with CAPIF/NEF. The new API request is then transmits to the network exposure layer 330.

In block 510, the API request is first received by the CAPIF in order to authenticate the API request. This is performed by the CAPIF obtaining the API ID of the API request and querying a tenant/API database of the network operator to determine if the tenant and API is authorized to receive data from the core network 410. For example, if the API ID is in the database and associated with a positive flag, and the query returns a positive value to the CAPIF 406, the CAPIF 406 authenticates the API and thus, the API request is permitted to be transmitted to the NEF 408, which is shown in block 512.

In block 514, the NEF 408 receives the API request from the CAPIF 406 in response to the CAPIF 406 authenticating the API and/or tenant. At this point, the NEF 408 then will determine which core slice 411-415 the API (or tenant) is associated with based on predefined criteria. The predefined criteria could be any criteria associated with the API and/or tenant, such as the subscription that the tenant has with the network, the time of day that the API request is received, the current capacity of the core slices, the type or quantity of data being requested, etc. For example, if the tenant has a premium subscription to high transmission rates, the tenant and thus, all APIs of the tenant, will then be assigned to the core slice which performs high transmission as opposed to the core slices that have lower transmission speeds. In this regard, the core slices can be set up so that only part of the core requires premium (and thus expensive) hardware components. Of course, the core slice could be associated with each API (or requesting device) instead of the tenant as a whole and, as such, the determination of the core slice could be based solely on the API ID as opposed to (or in addition to) the tenant ID.

To make the core slice determination, the NEF 408 will access a core slice database 516 which may reside on the core network 410, in an embodiment, or in a server separate from the core network 410. The NEF 408 will perform queries with the data from the API request to the core slice database 516 and then make a determination based on the predefined criteria and the queries results, as discussed above.

Once the core slice is determined for the API request, the NEF 408 will then determine the policy rules for the API and/or tenant, as provided in block 518. This may be performed by sending a query to the policy engine 401. The policy engine 401 is a software component that allows the network operator to create, monitor and enforce rules that the network operator wants to enforce for various users/ tenants. For example, tenant 1 340 may have a first set of policies that will only be enforced for tenant 340 while tenant 2 341 may have a second set of policies that will only be enforced for tenant 2 341, and both policies are saved and/or determined at the policy engine using policy maps, policy databases, artificial intelligence, and the like 519. The rules may be established in combination with the core slice being used so that certain core slices require certain policies and thus, the policy engine 401 may access the core slice database 516 as well.

In block 520, the determined core slice associated with or assigned to the API or tenant is saved on the core network 410 for future access at block 520.

Once the core slice and policies have been determined, the NEF 408 then allows data transfer between only the determined core slice 520 and the API and/or tenant 340 but only in accordance with the determined policies determined for the API and/or tenant 340.

Although specific embodiments were described herein, the scope of the invention is not limited to those specific embodiments. The scope of the invention is defined by the following claims and any equivalents therein.

As will be appreciated by one skilled in the art, aspects of the present disclosure may be embodied as a system, a method or a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium would include the following: a portable computer diskette, a hard disk, a radio access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a non-transitory computer readable storage medium may be any tangible medium that can contain, or store a program for use by or in connection with an instruction execution system, apparatus, or device.

Aspects of the present disclosure are described above with reference to flowchart illustrations and block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

What is claimed is:

1. A cellular network system comprising:
a multi-core network comprising a plurality of core slices;
at least one cell site configured to receive communications from a plurality of tenants; and
a memory device storing a set of instructions that when executed by one or more processors, causes the one or more processors to:
receive, through a network exposure layer at the at least one cell site, a plurality of requests for bandwidth from an application programming interface (API) of the plurality of tenants comprising a first request from a first API of a first tenant; and
provide data transfers between the first tenant and the first core slice in response to determining that the first core slice is associated with the first tenant and the first tenant being authenticated using a first core slice from the plurality of core slices that is associated with the first tenant, in response to the first tenant being determined to be authenticated, wherein the network exposure layer comprises:
a common API framework (CAPIF) configured to authenticate the first API; and
a network exposure function (NEF) configured to communicate between the first API and the multi-core network, in response to the first API being authenticated by the CAPIF.

2. The system of claim 1, wherein the network exposure layer is further configured to determine policy rules for the first tenant.

3. The system of claim 2, wherein the network exposure layer is further configured to allow the data transfer between first tenant and the first core slice only in accordance with the policy rules associated with the first tenant.

4. The system of claim 2, wherein the network exposure layer is further configured to not allow data transfer between first tenant and core slices other than the first core slice.

5. The system of claim 1, wherein the network exposure layer is further configured to:

receive a second request from a second API of a second tenant;

determine whether the second tenant is authenticated;

in response to the second tenant being determined to be authenticated, determine a second core slice from the plurality of core slices that is associated with the second tenant, wherein the second core slice is separate from the first core slice; and provide data transfers between the second tenant and the second core in response to determining that the second core slice is associated with the second tenant and the second tenant being authenticated.

6. The system of claim 1, further comprising an API gateway that is configured to receive and translate the plurality of requests into a format usable by the CAPIF or NEF.

7. The system of claim 1, further comprising an API gateway that is configured to receive and translate the plurality of requests into a format usable by the CAPIF or NEF.

8. A system for cellular communications for use with a multi-core network having a plurality of core slices, the system comprising:

one or more processors;

a memory device storing a set of instructions that when executed by the one or more processors, causes the one or more processors to:

receive, at a network exposure layer, a plurality of requests for access to the multi-core network through application programming interfaces (APIs) of respective plurality of tenants, the plurality of requests comprising a first request from a first API of a first tenant;

provide data transfers between the first tenant and the first core slice in response to determining that the first core slice is associated with the first tenant and the first tenant being authenticated using a first core slice from the plurality of core slices that is associated with the first tenant, in response to the first tenant being determined to be authenticated, wherein the network exposure layer comprises:

a common API framework (CAPIF) configured to authenticate the first API; and a network exposure function (NEF) configured to communicate between the first API and the multi-core network, in response to the first API being authenticated by the CAPIF.

9. The system of claim 8, wherein the network exposure layer is further configured to determine policy rules for the first tenant.

10. The system of claim 9, wherein the network exposure layer is further configured to allow the data transfer between first tenant and the first core slice only in accordance with the policy rules associated with the first tenant.

11. The system of claim 9, wherein the network exposure layer is further configured to not allow data transfer between first tenant and core slices other than the first core slice.

12. The system of claim 8, wherein the network exposure layer is further configured to:

receive a second request from a second API of a second tenant;

determine whether the second tenant is authenticated;

in response to the second tenant being determined to be authenticated, determine a second core slice from the plurality of core slices that is associated with the second tenant, wherein the second core slice is separate from the first core slice; and provide data transfers between the second tenant and the second core in response to determining that the second core slice is associated with the second tenant and the second tenant being authenticated.

13. A method for cellular communications between tenants and a multi-core system, the method comprising:

receive, at a network exposure layer, a plurality of requests for bandwidth from an application programming interface (API) of the tenants, the plurality of requests comprising a first request from a first API of a first tenant;

determine whether the first tenant is authenticated using information from the first request;

in response to the first tenant being determined to be authenticated, determine a first core slice that is associated with the first tenant, the first core slice being one of a plurality of core slices in the multi-core network; and provide data transfers between the first tenant and the first core slice in response to determining that the first core slice is associated with the first tenant and the first tenant being authenticated, wherein the network exposure layer comprises:

a common API framework (CAPIF) configured to authenticate the first API; and a network exposure function (NEF) configured to communicate between the first API and the multi-core network, in response to the first API being authenticated by the CAPIF.

14. The method of claim 13, wherein the network exposure layer is further configured to determine policy rules for the first tenant.

15. The method of claim 14, wherein the network exposure layer is further configured to allow the data transfer between first tenant and the first core slice only in accordance with the policy rules associated with the first tenant.

16. The method of claim 14, wherein the network exposure layer is further configured to not allow data transfer between first tenant and core slices other than the first core slice.

17. The method of claim 13, wherein the network exposure layer is further configured to:

receive a second request from a second API of a second tenant;

determine whether the second tenant is authenticated;

in response to the second tenant being determined to be authenticated, determine a second core slice from the plurality of core slices that is associated with the second tenant, wherein the second core slice is separate from the first core slice; and provide data transfers between the second tenant and the second core in response to determining that the second core slice is associated with the second tenant and the second tenant being authenticated.

* * * * *